United States Patent [19]

Bus

[11] Patent Number: 4,968,062
[45] Date of Patent: Nov. 6, 1990

[54] METHOD FOR PRODUCING A MAP

[75] Inventor: Aldert Bus, Groningen, Netherlands

[73] Assignee: Wolters Kluwer N.V., Amsterdam, Netherlands

[21] Appl. No.: 307,849

[22] Filed: Feb. 8, 1989

[30] Foreign Application Priority Data

Feb. 24, 1988 [EP] European Pat. Off. ........ 88200356.9

[51] Int. Cl.$^5$ ............................................. G09B 29/00
[52] U.S. Cl. ......................................... 283/35; 283/34
[58] Field of Search ..................... 283/34, 35, 36, 37, 283/38, 39, 40, 41, 42, 43; 434/150

[56] References Cited

U.S. PATENT DOCUMENTS

| | | | |
|---|---|---|---|
| 1,464,753 | 8/1923 | Denoyer | 283/34 |
| 1,921,332 | 8/1933 | Sanwald | 283/35 |
| 4,801,157 | 1/1989 | Sink | 283/34 |

FOREIGN PATENT DOCUMENTS

| | | |
|---|---|---|
| 2397690 | 7/1978 | France . |
| 8303809 | 6/1985 | Netherlands . |
| 2082503 | 3/1982 | United Kingdom . |
| 2119147 | 11/1983 | United Kingdom . |

Primary Examiner—Douglas D. Watts
Assistant Examiner—Thomas Hamill, Jr.
Attorney, Agent, or Firm—Watson, Cole, Grindle & Watson

[57] ABSTRACT

A method is provided for producing a foldable map of a region. First, an elongated piece of zig-zag folded material is provided having a plurality of spaced folds extending transversely of the length of the piece of material to define sheets between adjacent folds. This zig-zag material has a map display area having a total length to width ratio of a certain value. Next, a reference map of the region is divided into a plurality of rectangular strips of constant width. Each of the strips has a length which corresponds to the portion of the region within the associated strip, so that the ratio of the total length of the strips to the constant width is minimally smaller than the certain value. Then, the strips are reproduced on the piece of folded material so that particular strips appear on a maximum number of adjacent sheets.

3 Claims, 8 Drawing Sheets

METHOD FOR PRODUCING A MAP

The invention relates to a novel method for producing a map of a region.

A map produced according to a conventional method is known from NL-A-8303809 and has evolved from earlier known motoring maps which are zig-zag folded, as a result of which they can be partially unfolded and are easier to handle in the restricted space of an automobile.

A map of the conventional type opens like a book, whereby the table of contents is shown on the front flap and using reference symbols arranged on the margins refers to pages having a particular map sector.

The above mentioned earlier zig-zag folded motoring maps are formed by a full map of the relevant region which is made easier to handle only by the zig-zag folding. A map produced according to the current method comprises on the other hand a number of separate maps of sub-regions. These can however thereby be ordered such that sheets showing contiguous sub-regions are arranged on following pages of the folded map.

The choice of the division of the region into a number of sub-regions, and the subsequent distribution of these sub-regions conventionally over the available pages of the map determines to a very large extent the utility of the map. It has been found that maps produced according to the current method that are obtainable on the market have a more or less chance construction which by no means always ensures optimum utility. It is assumed that this is the result of the large number of variables that play a part in the construction of the map. In the usual trial and error method by no means all the values resulting in optimum utility are found for all variables.

The purpose of the invention is to provide a method of the type under consideration with which maps can be produced of optimum utility. This is achieved according to the invention. As a result the optimal strip division is first found, whereby, taking into account the chosen points of departure, the largest possible scale for the map is obtained. As a result of the approach of reproducing the region on the map in the form of strips and as a result of making the relationship between adjoining strips entirely secondary, a distribution of the sub-regions over the pages of the map is achieved of optimum utility. Giving no consideration or only secondary consideration to the relationship between adjoining strips is not a drawback for the use of the map since in going from a sub-region from one strip to a sub-region in an adjoining strip another set of pages has in any case always to be turned over. Using the table of contents on the front page the relevant set of pages can be localized quickly and it is of no importance if this set is to be found on set of pages not located nearby.

When the region to be shown on the map enables sufficient freedom of choice. When a series of maps of different regions is produced with the method according to the invention a systemetic arrangement is achieved as a result. The result here is that the first pages of the folded map will contain the sub-regions most frequently consulted.

A further development of the method according to the invention is characterized in claim 4. The division can be hereby further improved in terms of detail.

With the method according to the invention sufficient map space will generally already be available to form an overlap between contiguous sub-regions of one strip. Using the step as claimed in claim 5 an overlap can likewise be formed between successive sub-regions of adjoing strips.

By employing the step it will be possible, that is, to show the regions of importance on as large a scale as possible.

It is noted that as a result of the method the usual cartographic scope is not limited. Island groups or outjutting portions of the region for example can thus be shown in the usual manner on an inset map.

The invention will be further elucidated in the following description with reference to the annexed figures.

Figure 1:
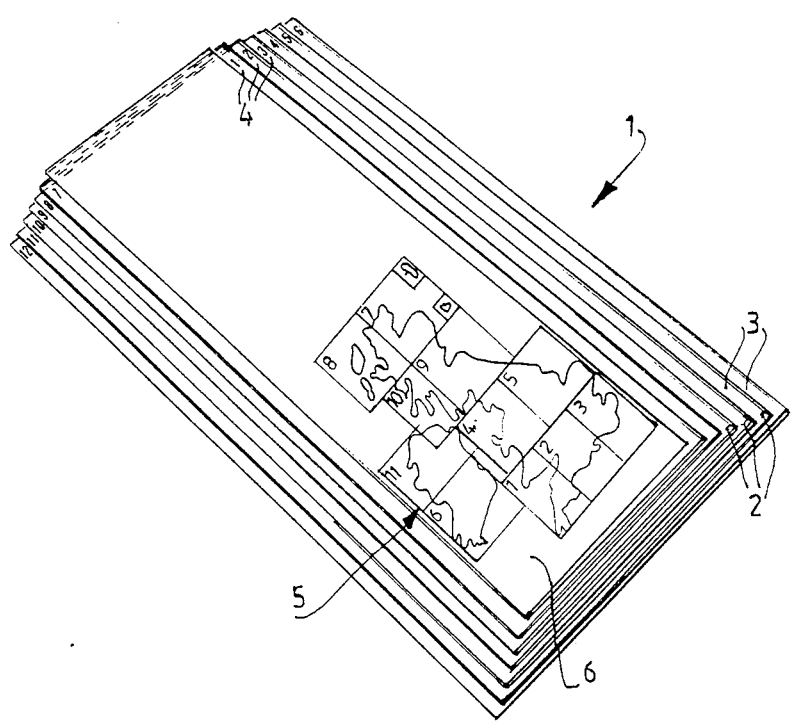
FIG. 1 shows in perspective view a map produced with the method according to the invention.

The map 1 shown in FIG. 1 consists of an elongate strip of sheet material folded up in a series of zig-zag folds 2. Each sheet section between two successive folds is a margin 3 wider than the previous section. This margin consequently protrudes outside the preceding sheet sections and remains visible in the folded state of the map 1 that is shown. Printed on each margin 3 are reference symbols 4 which may take the form of numbers and/or different colours. On each pair of pages that lie against each other in the folded position is printed a sub-region corresponding to a portion of the total region shown by the map. Printed on the front flap 6 of map 1 is a key map 5 of the whole region shown by the map, whereby the division into sub-regions is indicated on this map. The corresponding reference symbols are also to be found on key map 5 so that the map of the relevant sub-region can be found simply.

Figure 2:
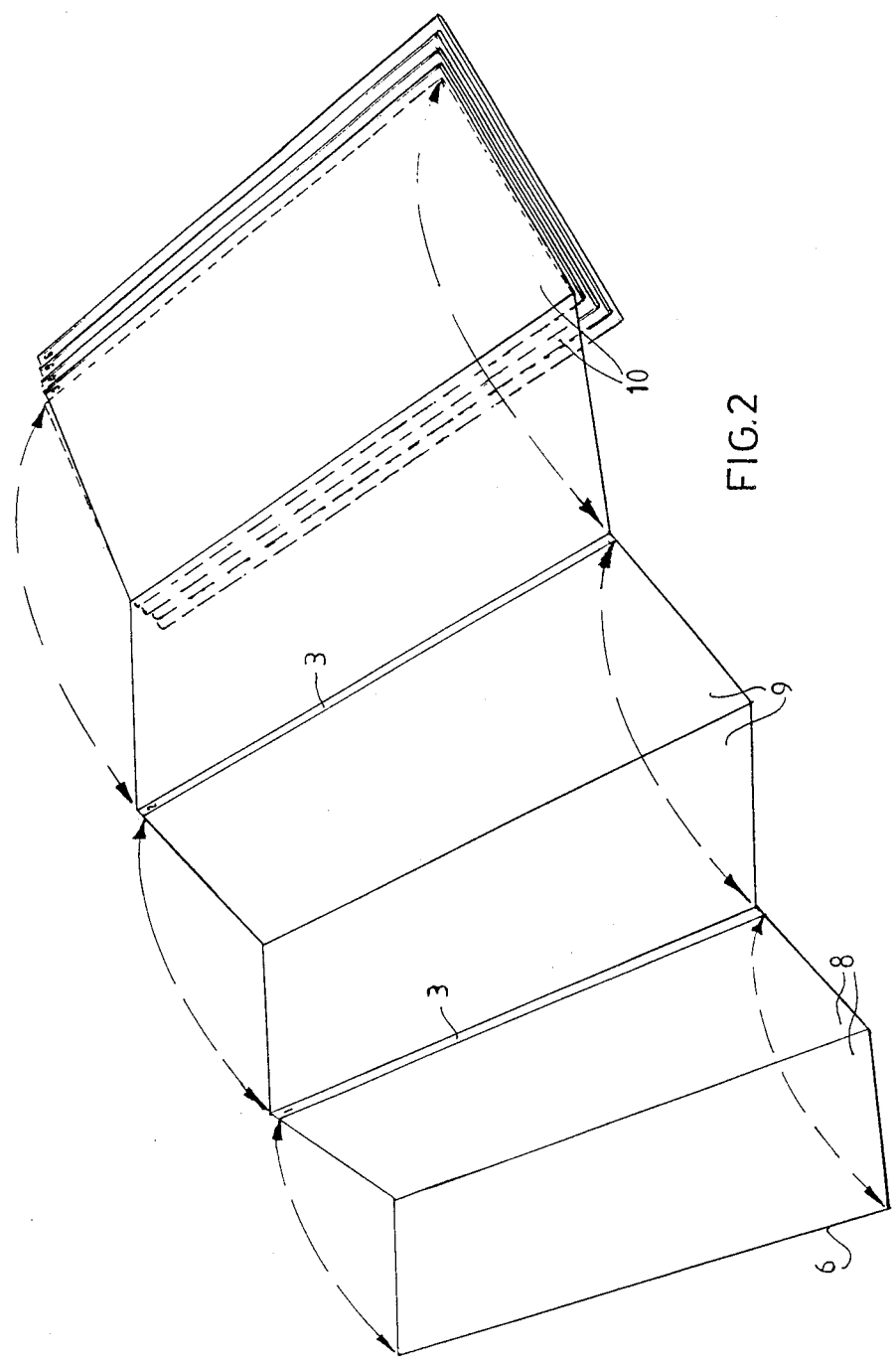
FIG. 2 and 3 show the manner in which the map obtained with the method according to the invention is used.

The map is printed on both sides and may be folded out to the left as shown in FIG. 2 so that the sheets printed on the front side become visible.

Shown in FIG. 2 are three pairs 8, 9, 10 of pages which in the folded position lie against one another and which have the margin 3 arranged on their edge.

Figure 3:
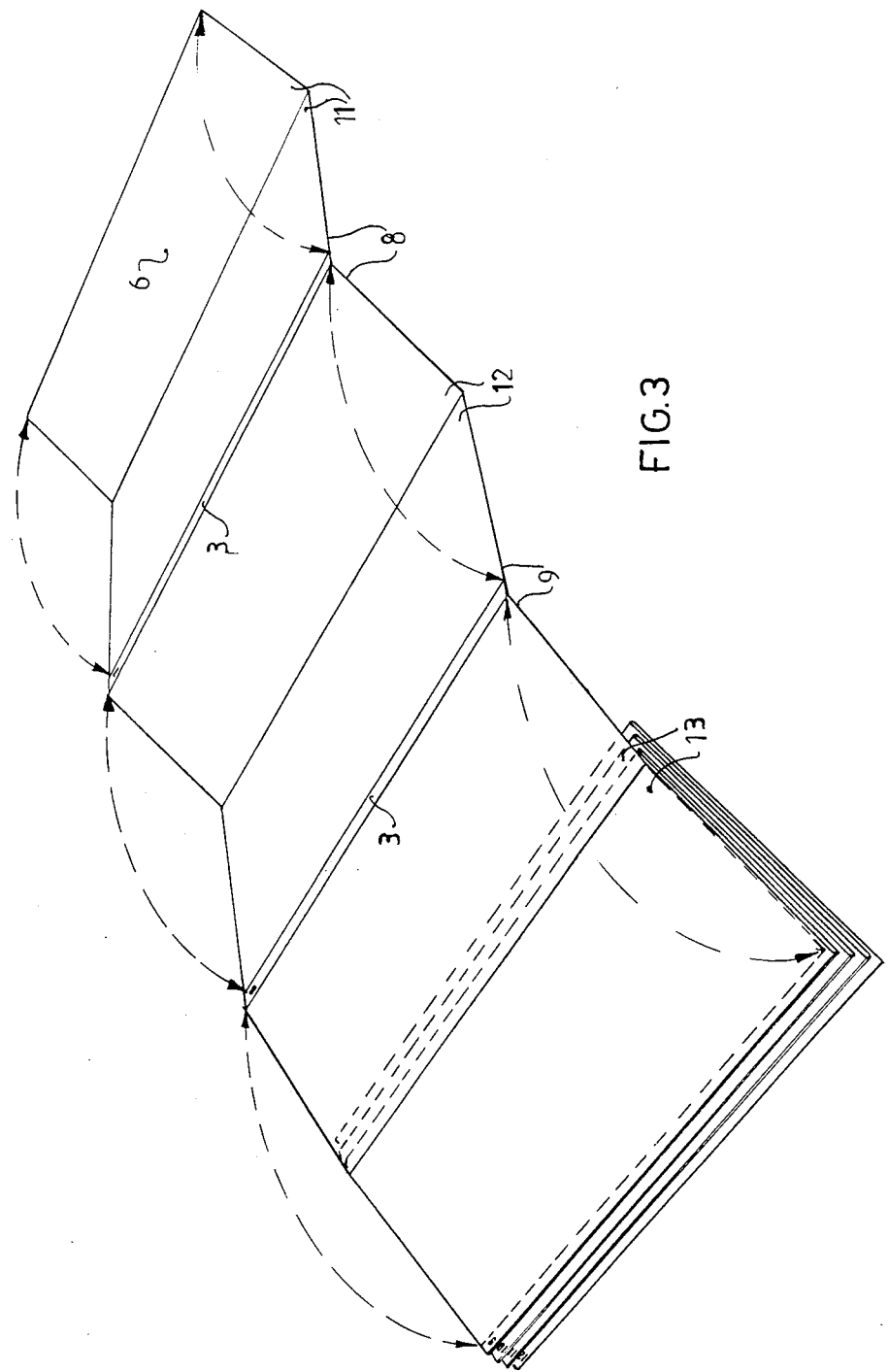

FIG. 3 shows in similar manner three pairs of pages 11, 12, 13 which contain maps printed on the back of the sheet material. It may of course be sufficient in use of the map 1 to fold open the pair of pages showing the sub-region to be referred to. Map 1 is thereby handled as a book that can be unfolded both to the left and the right. As shown in FIGS. 2 and 3, however, a number of adjoining sheets can also be viewed at one time. It may be useful in acquiring an overview if adjoining maps show contiguous sub-regions.

Figure 4:
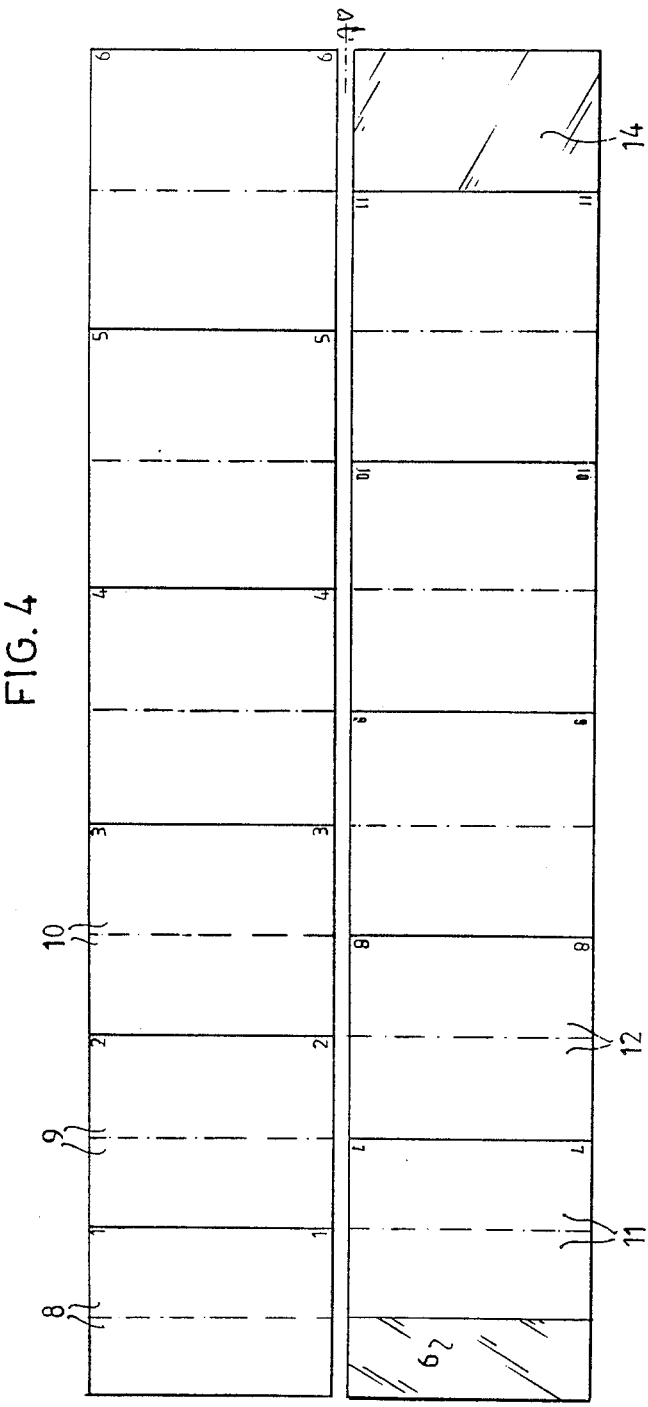
FIG. 4 shows front and rear views of a strip of sheet material used as point of departure for a map to be produced, the folds to be arranged being shown therein.

Shown in the top half of FIG. 4 is the front of the strip sheet material, while in the bottom half of FIG. 4 the rear side is shown in turned over position. The fold lines where forward facing folds have to be arranged are indicated in full lines and the fold lines where rearward facing folds have to be arranged are indicated with dash and dot lines. It will be apparent that a forward facing fold on the front side corresponds with a rearward facing fold on the rear side. The coacting pairs of pages, which must each contain a map of a sub-region, lie between two full fold lines or between their end edge and a full fold line. As observed earlier, the front flap 6 is used to show the table of contents 5. The rear flap 14, which in the chosen example with eleven folds is located on the rear side of the sheet material, may also contain a sub-region of the map, but is preferably used for showing the legend and a slightly detailed outline map of the relevant region. The total surface area of the map available for showing the relevant region is thus determined in this embodiment by the total surface area of the pairs of pages designated with the reference marks 1–11 inclusive.

By way of explanation the method will now be described as it is employed for the production of a map of Great Britain and Ireland, starting from a strip of sheet material as shown in FIG. 4.

Figure 5:
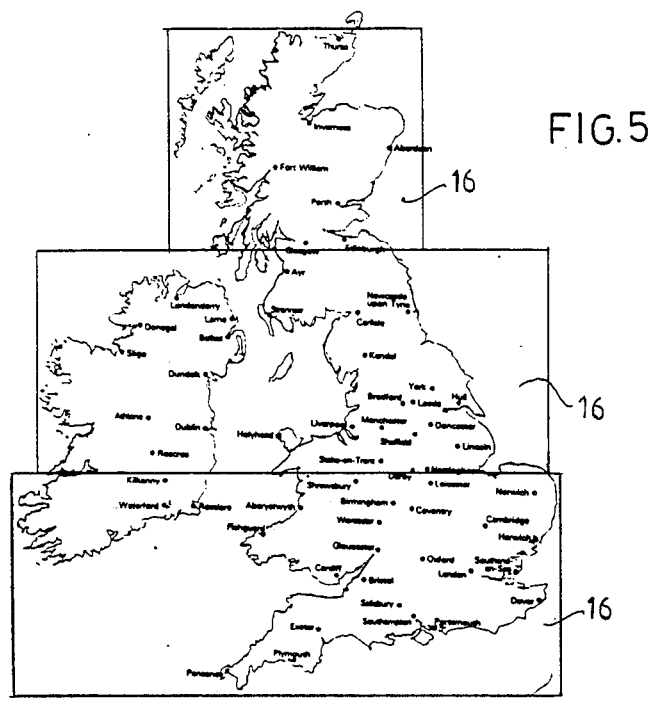
FIG. 5–7 show respectively three possible strip divisions for a region to be shown on a map.
Figure 6:
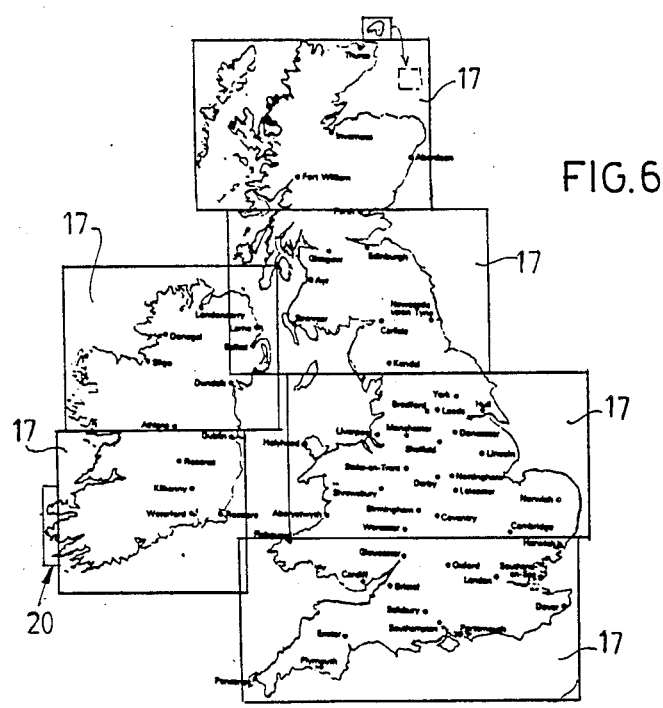
Figure 7:
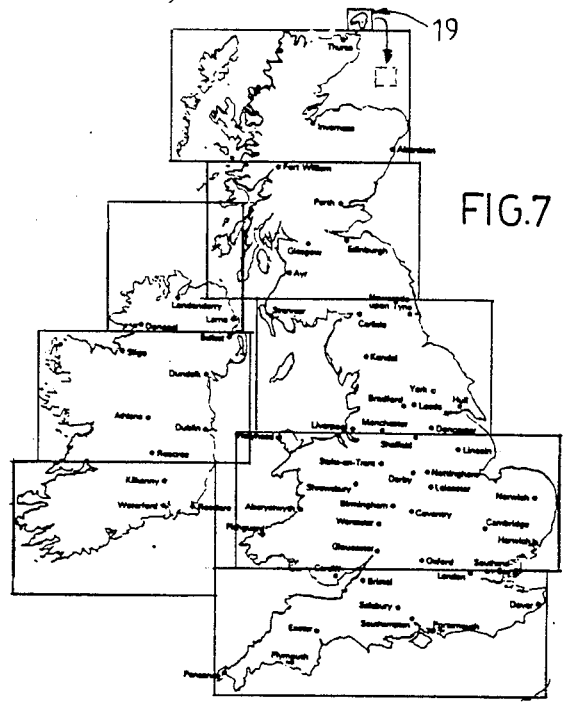

The point of departure is a map to scale of the region concerned as shown in the FIGS. 5–7. The scale map is divided into a number of equally wide strips. The map in FIG. 5 is divided into three strips 16, each having a width corresponding to a third of the maximum north-south measurement. Each strip has a length such that a minimum surface area of contiguous region is covered.

FIG. 6 and 7 show strip divisions whereby each strip has a width corresponding to a quarter and a fifth, respectively, of the maximum north-south measurement. Each strip is again chosen such that a minimum surface area of contiguous region is covered. With the division of FIG. 6 six strips 17 result, while in FIG. 7 eight strips 18 are obtained.

As is clear from the figures, the assumption that a minimum surface area of contiguous region is covered can result in parts which can be considered as more or less separate being divided into separate strips, as is shown for Ireland and Ulster in FIG. 6 and 7. A certain overlap may thereby occur between strips in their lengthwise direction.

At this stage the usual cartographic operations can be carried out for the purpose of achieving maximum utilization of the surface area. As indicated at 19 in FIG. 7 it can be anticipated at this stage than an island of an island group can be shown on an inset map. Performing of this operation likewise results in limitation of the contiguous region that is covered.

Subsequently, for each strip division, that is, for each of the FIGS. 5, 6 and 7, the length of each strip is determined such that each strip comprises precisely the relevant portion of the region on the map. These lengths are drawn in the FIGS. 5–7. Known cartographic operations can also be hereby performed. Thus for example, as is shown at 20 in FIG. 6, a particular portion of the region that is unimportant for the intended purpose of the map, in the current case as motoring map, can be omitted or also shown in an inset map.

For each strip division the ratio of the total length of all the strips to the strip width is then determined. It is simple to work out that for the strip division of FIG. 5 this ratio amounts to 5.9, for the strip division of FIG. 6 to 9.4, and for the strip division of FIG. 7 it is 14.5.

With reference to FIG. 4 it can be determined that the ratio of the total length of all the available pages in the transverse direction of the folds, that is, in the direction from left to right in FIG. 4, to the height thereof is 10.0.

In accordance with the method according to the invention the strip division selected as being suitable is that whereby the said ratio is minimally smaller, that is, the closest to and still smaller than the said ratio 10.0. This is therefore the strip division of FIG. 6, whereby the ratio of the total length of all the strips to the strip width amounts, as noted earlier, to 9.4.

By selecting the strip division whereby the length-width ratio is just smaller than the length-width ratio of the available surface area on the map, the largest possible scale is on the one hand obtained for the final map, while on the other hand slightly more material is available in lengthwise direction of the sheet material for the map than corresponds with the total length of the strips. This extra space could be utilized for dividing the strips into the separate sub-regions and perhaps also for forming an overlap between sheets showing contiguous sub-regions.

Preferably at this stage in accordance with the invention the scale of the map for printing is calculated from the scale of the scale used as a starting point, as shown in the FIGS. 5–7, by multiplying this scale by the quotient of the height of the sheet material and the strip width, that is, the measurement of a strip 17 in FIG. 6 taken in the direction from top to bottom. When it is desired to provide the maps with an overlap in transverse direction of the strips, that is, in the example on the top and bottom edges of the maps, the scale obtained in this way is reduced by a percentage corresponding to the desired overlap. The scale obtained is then reduced to a proximate map scale of round figure value, which normally amounts to a small whole number times a whole power of ten.

For the following phase of the method the strip division on the map is adjusted to scale to the determined scale of the map to be printed. That is, the width of each strip 17 and in FIG. 6 is taken such that it corresponds with the north-south dimension of the sub-regions to be shown on the map. A limited rearrangement of the strips may hereby be carried out.

As a result of adjusting the map scale in the manner described according to the invention, the extra available space in lengthwise direction of the map will also have increased relative to the required length corresponding to the total length of the strips. The possibilities for a suitable division into sub-regions have as a result been increased such as to result generally in a reasonable freedom of choice.

Figure 8:
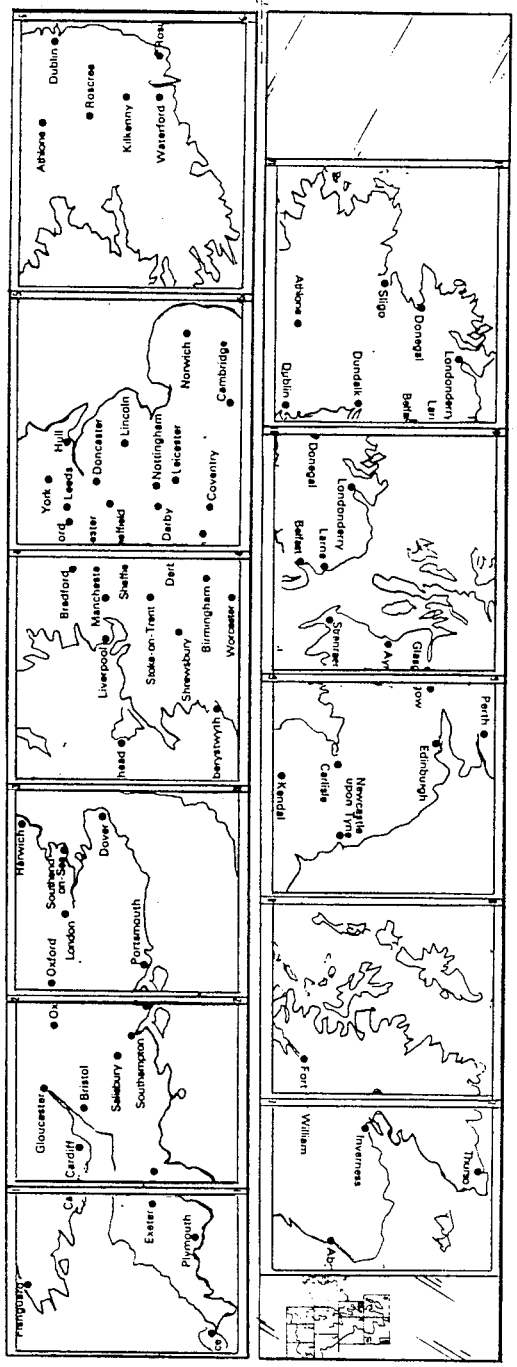
FIG. 8 shows a front and rear view of a map produced with the method according to the invention.

In the following stage of the method according to the invention a maximum number of groups of adjoining pages are selected whereby each group has a total length corresponding proportionally at least to the length of a strip of the chosen strip division. This has the consequence that sub-regions that are contiguous in the strip direction are shown as well as possible on adjoining pairs of pages. As a result of unfolding of the map in the manner shown in FIG. 2 and 3 an overview of a much larger region than a single sub-region can be obtained. FIG. 8 shows the result of such a selection whereby the priority has been maintained of adding the most important part of the region, in this case the most southerly strip, to the first of the righthand pairs of pages of the zig-zag folded map, that is in FIG. 4 the pairs of pages 8, 9 and 10 indicated respectively with "1", "2" and "3". The pairs of pages designated with "4" and "5" have a length that is only just greater than the second strip from the bottom shown in FIG. 6, so that for this strip are selected the said two pairs of pages. The two topmost strips are added in a similar way to the group of adjoining pages defined by "9" and "10" and the pages defined by "7" and "8"respectively. As is further apparent form FIG. 8 the pair of pages corresponding with "6" is added to the strip covering the south of Ireland, while the pair of pages corresponding with "11" is added to Northern Ireland with Ulster.

Although in this embodiment of the method according to the invention the Ireland with Ulster forming one whole is shown on two sheets that are completely separated from each other, and are even included on two different sides of the final printed map. In the case of a journey from the south of Ireland to the north, a driver is at a given moment in a location such that he "drives off" the top of the map. In that case the driver consults the key map 5 on the front flap 6, as shown in FIG. 1, and sees that he must go from sheet 6 to sheet 11. This can be done without any unnecessary searching. The fact that the sheets 6 and 11 are printed on the map in places far removed from each other has no adverse effect on its utility. The advantage is on the other hand achieved that Ulster and the part of Northern England located opposite are shown on one sheet, namely sheet "10". The portion of Ireland bordering on Ulster is again to be found on the adjoining sheet "11". By unfolding the map such that the map parts "9", "10" and "11" lie open, a good overview is obtained of a region important in its entirety.

The freedom of choice previously referred to also permits other divisions. Thus in the map shown in FIG. 9 the point of departure is that in the selecting of the groups the most northerly strip is added to the first of the right-hand pairs of pages of the zig-zag folded map, that is, the pairs of pages 8 and 9 as shown in FIG. 4. The following strip in southerly direction is added to the pairs of pages corresponding to the sheet "3" and "4". The third strip away from the north is added to the sheets "5" and "6", while the most southerly strip is added to sheets "7", "8" and "9". Finally, Ireland and Ulster are added to the sheets "10" and "11".

Figure 10:
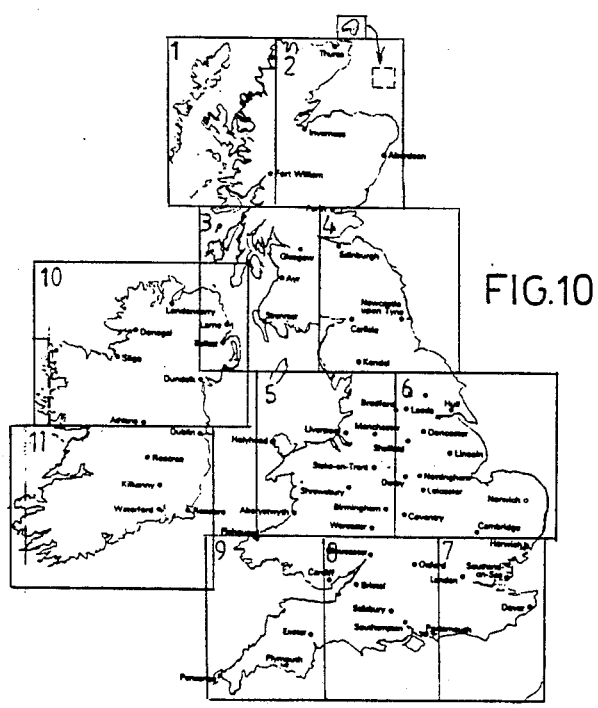
FIG. 10 is a map to scale having an arrangement into sub-regions obtained with the method as applied in the map from FIG. 9.

This division is also shown in FIG. 10 by way of elucidation.

Figure 9:
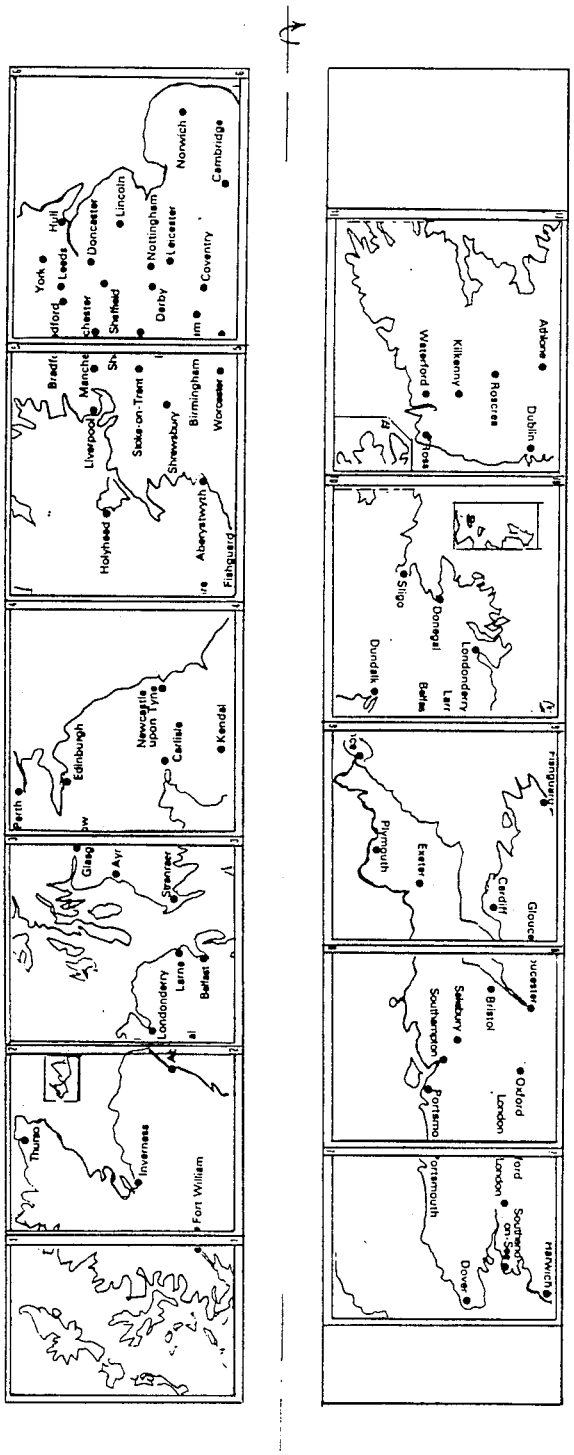
FIG. 9 shows views similar to FIG. 8 of a map obtained according to the invention having a different arrangement.

The map form FIG. 9 has a more systematic north-south division, which may be desirable when the map forms part of a set of maps for which a stricter system structure is required. In view however of the direct accessibility of the different sectional maps by means of the key map given on the front flap it is not essential for good utility of the map, even when it forms part of a set, that such a stringent structure is applied.

The method according to the invention can be used not only for maps of countries but also for instance for street maps. Although in general a manner of folding as shown in FIG. 1 will be preferred, whereby the folds run in the position of use from top to bottom, the invention is not limited thereto. A map whereby the folds in the position of use run horizontally can also be produced in a very satisfactory manner with the method according to the invention.

It is noted that during the different stages of the method according to the invention small adjustments which are within the scope of a cartographer and the positive effect of which may be anticipated, can be carried out. If after the preceding the result is a final, undesired division which is for example the consequence of the specific characteristics of the region to be mapped, then in accordance with a further development of the invention different dimensions of the strip of sheet material and/or a different to the invention is repeated from the point of the choice of strip division.

I claim:

1. A method of producing a foldable map of a region comprising:
   providing an elongated piece of zig-zag folded material including a plurality of spaced folds extending transversely of the length of the piece of material to define sheets between adjacent folds and including a map display area having a total length to width ratio of a certain value;
   providing a reference map of the region;
   dividing the reference map into a plurality of rectangular strips of constant width with each of said strips having a length which corresponds to the portion of the region within the associated strip;
   comparing the ratio of the total length of said strips to said constant width with said certain value;
   repeating the dividing and comparing steps until a comparison is determined wherein the ratio of the total length of said strips to said constant width is minimally smaller than said certain value, and then selecting these rectangular strips; and
   reproducing said selected strips on said piece of folded material so that particular strips appear on a maximum number of adjacent sheets.

2. The method according to claim 1, further comprising, prior to said reproducing step, scaling said strips to a map scale value such that the value is equal to a product of a scale of the reference map and a quotient of the sheet width and a strip width.

3. The method according to claim 1, wherein said dividing step includes dividing the width of said strip in a direction transverse to the larger dimension of the reference map.

* * * * *